June 30, 1959 W. G. GIBSON 2,892,884

MATRIXING APPARATUS

Filed Dec. 7, 1954 3 Sheets-Sheet 1

INVENTOR.
Walter G. Gibson
BY
[signature]
ATTORNEY

June 30, 1959 W. G. GIBSON 2,892,884

MATRIXING APPARATUS

Filed Dec. 7, 1954 3 Sheets-Sheet 2

INVENTOR.
Walter G. Gibson
BY
[signature]
ATTORNEY

INVENTOR.
Walter G. Gibson
BY
ATTORNEY

United States Patent Office 2,892,884

Patented June 30, 1959

2,892,884

MATRIXING APPARATUS

Walter G. Gibson, Princeton, N.J., assignor to Radio Corporation of America, a corporation of Delaware Application December 7, 1954, Serial No. 473,690

18 Claims. (Cl. 178—5.4)

This invention relates generally to matrixing apparatus, and particularly, but not exclusively, to matrixing apparatus of the so-called masking amplifier type.

In signalling systems, such as color television systems, particlularly of the so-called simultaneous type, it is often desirable or necessary to provide apparatus for effecting controlled mixing of individual component signals, such as the component color signals representative of different color aspects of an image in such a television system. For example, the signal specifications adopted by the FCC as color television broadcast standards call for the formation of various signals which are linear mixtures of respective component color signals in predetermined proportions and polarities. More specifically, such mixture signals include so-called "I" and "Q" signals which correspond respectively to the following mixtures:

$$.60E_R-.28E_G-.32E_B;\text{ and }.21E_R-.52E_G+.31E_B$$

where $E_R$, $E_G$ and $E_B$ are the gamma-corrected voltages corresponding to the red, green and blue signals intended for the color picture tube. The aforementioned signal specifications also call for the formation of a so-called "Y" signal, the monochrome portion of the color picture signal, which corresponds to the following mixture of component color signals:

$$.30E_R+.59E_G+.11E_B$$

To permit formation of the aforementioned I, Q and Y signals from appropriate red, green and blue signals, apparatus must be provided which is capable of linearly combining the respective component color signals with appropriate polarities and relative amplitudes. Such mixture signal forming is generally known as matrixing, and amplifying apparatus providing such operation is generally referred to as a matrixing amplifier.

The present invention is concerned with apparatus of the matrixing amplifier type. In particular, embodiments of the present invention, which shall be subsequently discussed in detail, provide matrixing amplifiers which have significant advantages in use for performing so-called "masking" operations in a color television system. While the term "masking" has a well-known meaning in the color photography art and has a more or less analogous meaning in the color television art, it may be advantageous to briefly explain the function of "masking" in a color television system. In any color television system there are two basic terminal operations: the derivation of color information from an image by appropriate pickup apparatus, and the reproduction of said image from said color information by suitable image reproducing apparatus. The pickup operation generally requires the analysis of light from the image into specific component colors, while the image reproducing operation generally requires reproduction of the image in specific component colors, which are combined in one manner or another to duplicate the appearance of the original image to a viewer. It may well be appreciated that if the image information supplied to the image reproducer is in terms of component colors other than the component colors which the reproducer employs to reconstruct the image, a faithful reproduction of the original image will not be achieved. Thus, if the primary colors in which the pickup apparatus analyzes light from the subject image do not correspond to the primary colors in which the reproducer establishes component images, the system must provide means for converting the originally derived color information into terms of the reproducer primaries if faithful reproductions are to be achieved. Conversion may be effected by suitable mixing of the signals originally derived to provide mixture signals which substantially correspond to the reproducer primaries, i.e., the information contained in the respective mixture signals corresponds substantially to the information which would have been obtained had the pickup analysis of light from the image been originally in terms of the reproducer primaries. This effective shifting of "taking" primaries is referred to as "masking" in analogy to masking steps used in color photography for similar primary shifting purposes. The apparatus employed to effect this electronic masking is referred to as a masking amplifier.

Many of the masking operations desired or required in a color television system involve only increases in the effective saturation of the taking primaries. Thus, for example, the corrections for photographic film dye deficiencies or for pickup camera spectral response errors generally require little actual shifting of the hues of the primary colors, but rather mainly a compensation for undesired dilution or insufficient selectivity.

In accordance with embodiments of the present invention, apparatus in the form of masking amplifiers is provided for linearly mixing component color signals in desired proportions and with appropriate polarities, wherein mixture adjustments may be effected with optimum convenience. More specifically, in accordance with embodiments of the present invention, novel and improved masking amplifiers are provided which are always "white balanced" irrespective of component color signal proportion adjustments. In this regard, it may be noted that where masking amplifiers are used in color television systems for altering a set of component color signals, it is necessary that the respective output signals of the masking amplifier be balanced for signals representative of white or "gray" shadings thereof. That is, when light from the subject image corresponds in color to the color determined as "white" for the system, each of the respective signal outputs of the masking amplifier must be substantially equal. In the usual matrixing or masking amplifiers heretofore known, the necessity of "white balancing" rendered the adjustment of input signal proportions to obtain a particular mixture signal output a rather laborious process, since adjustment of one input component for any one output channel required an accompanying compensating adjustment of at least one other input component for that output channel (or else appropriate adjustments for all of the other output channels) in order that the respective outputs remain balanced for white signals. In accordance with the present invention such interdependence of adjustments for maintaining white balance is eliminated, and adjustment operations are thereby simplified.

Thus, in accordance with embodiments of the present invention, a simplified "white balanced" masking amplifier is provided. In accordance with particular embodiments of the present invention, apparatus is provided for operating upon each component color input signal in such a manner that the output comprises a desired combination of a pair of color-difference signals with an unmodified version of the input signal. Operation is such that when the input signals are representative of white or gray shadings thereof, the color difference signals disappear, and the matrix settings thus have no effect on the "white balance" of the masking amplifier output signals. Due to the nature of the novel masking amplifier apparatus whereby masking is effected through the combination of color-difference signals with a straight-through signal, a significant improvement in the signal-to-noise ratio of the masking amplifier output signals is achieved over that of more conventional matrixing apparatus. This improvement may be attained through the provision of low pass filters in the paths of the aforementioned color difference signals to eliminate troublesome high frequency noise. Since in the standard color television system high frequency color signals are not utilized as such but only in combination for brightness signal purposes, masking is not needed at high frequencies and the above-described filtering of high frequency noise components may be carried out without restricting the usefulness of the masking amplifier.

Accordingly it is a primary object of the present invention to provide novel and improved means for selectively effecting mixtures of different component signals in a signalling system.

It is a further object of the present invention to provide an improved matrixing network whereby matrix adjustments are simplified.

It is another object of the present invention to provide a color television system with an improved masking amplifier which is balanced for white signals irrespective of adjustments of input signal mixture proportions.

It is an additional object of the present invention to provide a color television system with a masking amplifier in which adjusting operations are simplified by provision for a "constant white" output.

It is also an object of the present invention to provide novel matrixing apparatus involving a significant improvement in signal-to-noise ratio over more conventional matrixing apparatus.

Another object of the present invention is to provide a color television system with a novel and simplified "white balanced" masking amplifier having a high signal-to-noise ratio.

Other objects and advantages of the present invention may be readily ascertained by those skilled in the art upon a reading of the following detailed description and an inspection of the accompanying drawings in which.

Figure 2:
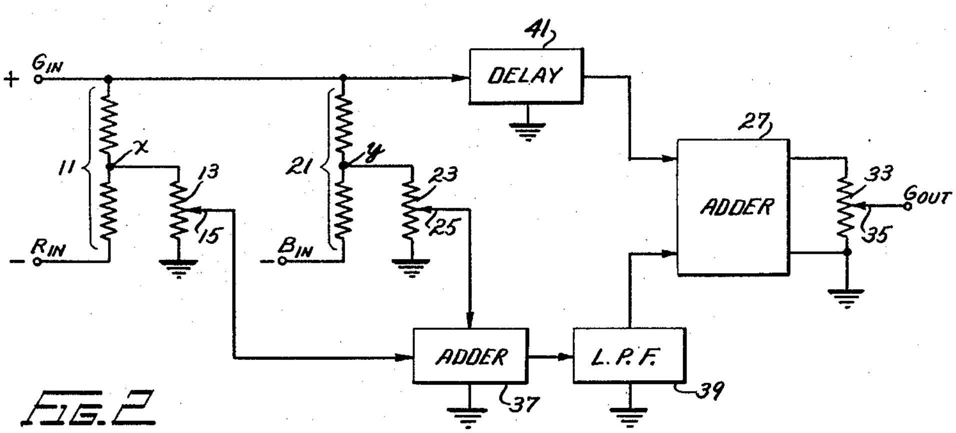
Figure 2 illustrates in block and schematic form a modification of the apparatus illustrated in Figure 1 in accordance with another feature of the present invention.
Figure 3A:
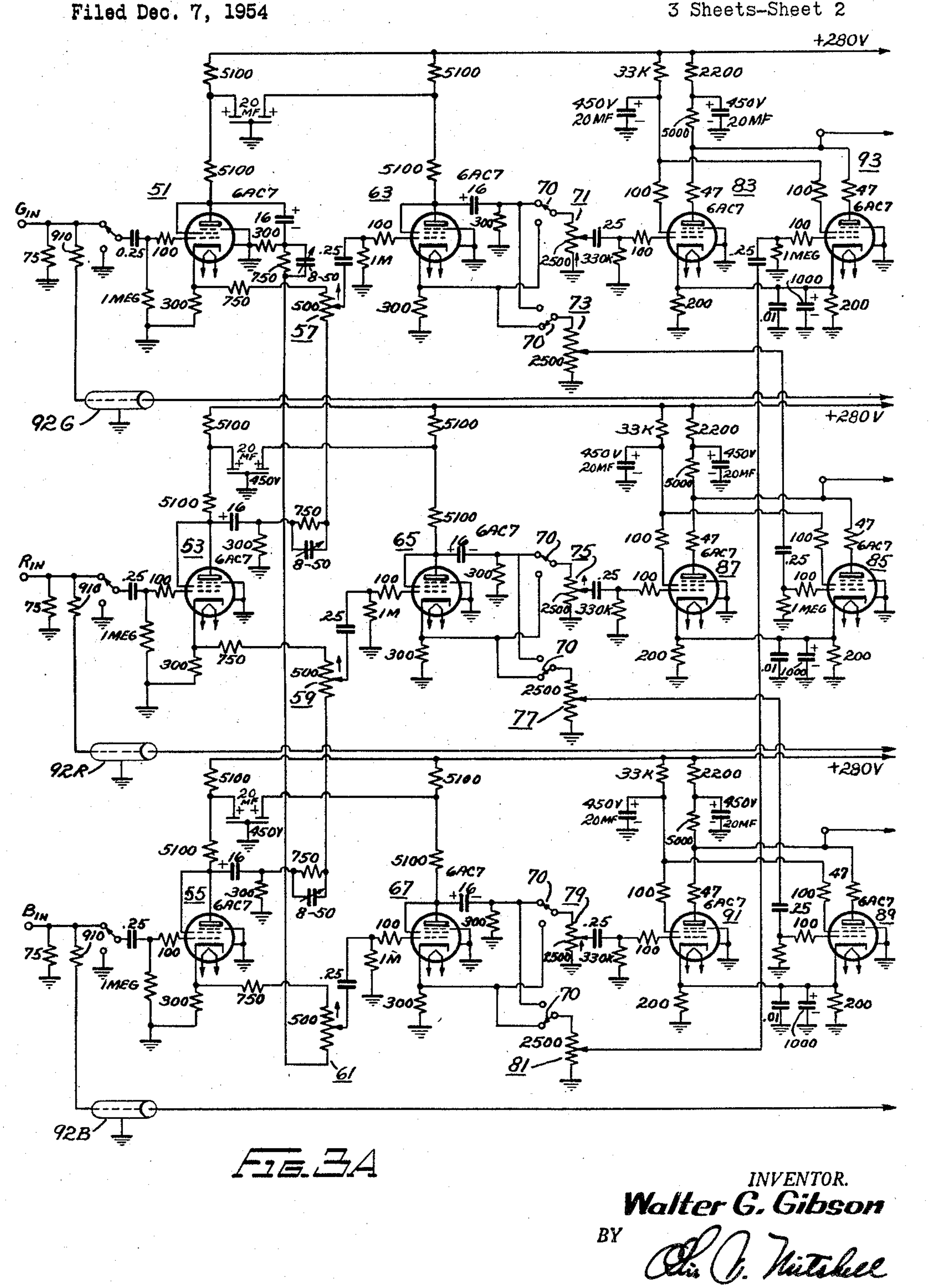
Figure 3B:
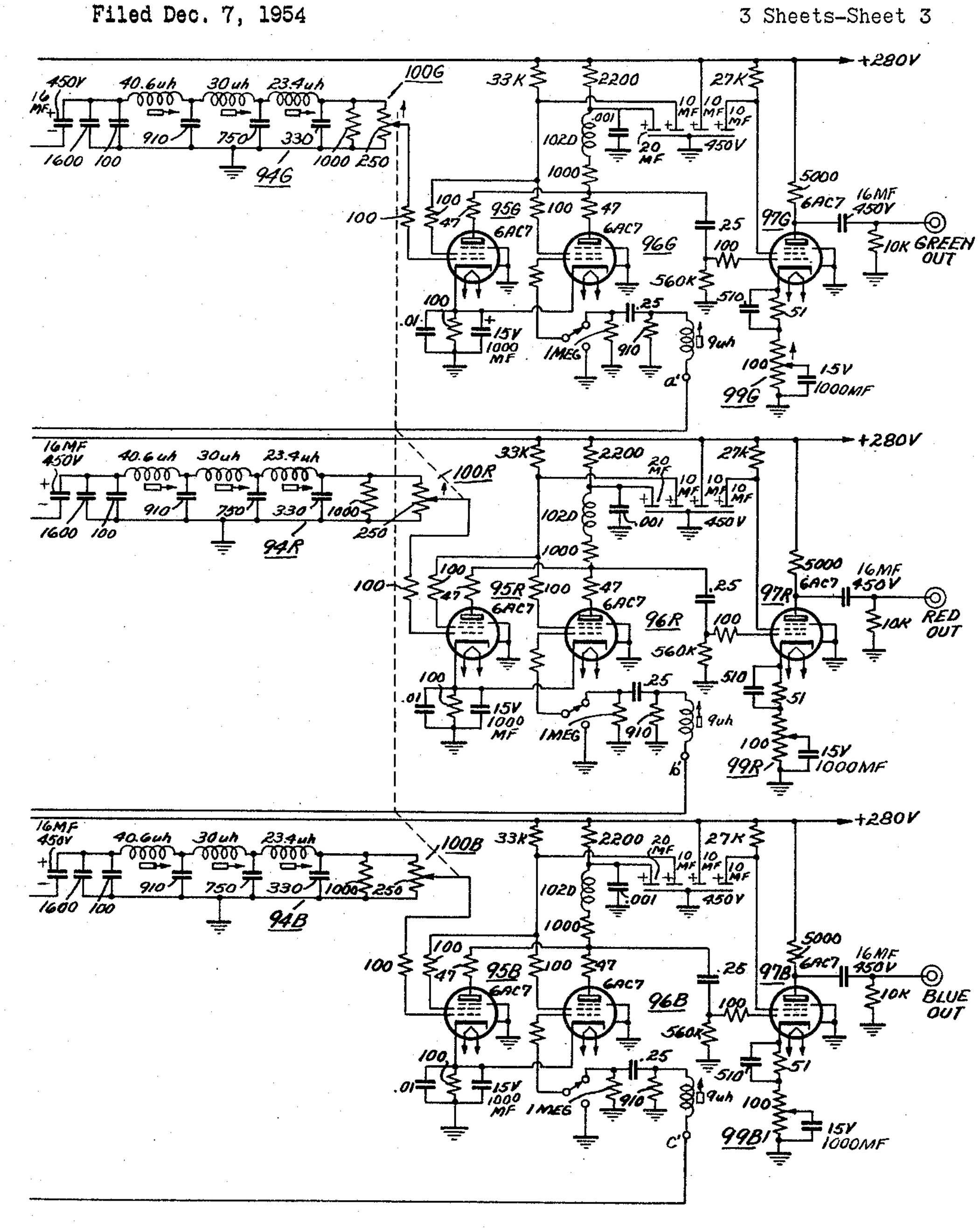

Figures 3*a* and 3*b* illustrate in schematic detail a color television masking amplifier in accordance with the principles of the present invention and incorporating the feature illustrated in Figure 2.

Figure 1:
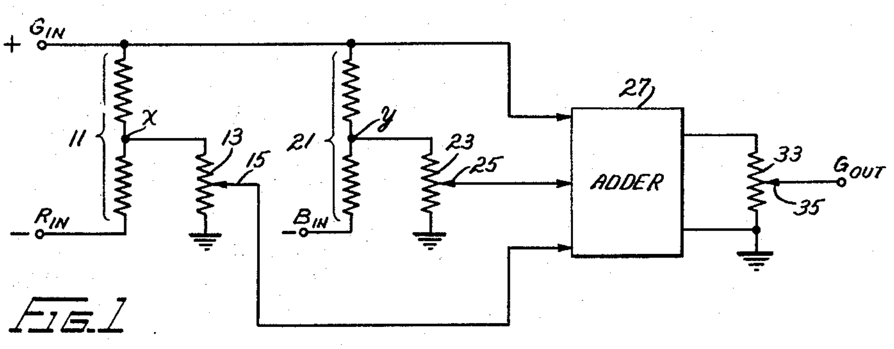
Figure 1 illustrates in block and schematic form a representative portion of matrixing apparatus embodying the principles of the present invention.

Referring to Figure 1 in greater detail, a portion of matrixing apparatus in accordance with an embodiment of the present invention is illustrated, the matrixing apparatus particularly serving masking purposes of the aforementioned saturation-increase type. Only the green signal channel of the masking amplifier has been illustrated in Figure 1, but appreciation of the structure and operation of the illustrated green signal channel will result in a similar understanding of the comparable structure and operating principles of the additional red and blue signal channels of the overall masking amplifier.

For purposes of simplification of the drawing, it has been assumed that the masking amplifier of Figure 1 operates in a color television system provided with a source of respective green, red and blue component color signals of a simultaneous character. The source may, for example, comprise a simultaneous color television camera of a well-known type, such as the conventional three-tube color camera. It has also been assumed that there is associated with the color signal source suitable phase-splitting means, whereby each component color signal is available in mutually opposite polarities, one of these polarities being arbitrarily designated "plus" and the other "minus" for the purposes of this description. Thus, in the drawing, a number of signal input terminals have been indicated, each labeled with a letter and a polarity sign to represent the particular component color signal applied to that input terminal and the relative polarity thereof. In particular, the green signal channel illustrated in Figure 1 is provided with three input terminals, $+G_{IN}$, $-R_{IN}$ and $-B_{IN}$. A center-tapped resistance 11 is connected between terminals $+G_{IN}$ and $-R_{IN}$, while an additional center-tapped resistance 21 is connected between terminal $+G_{IN}$ and terminal $-B_{IN}$. Adjustable voltage dividing means in the form of a potentiometer 13 is connected between the center tap "*x*" of resistance 11 and a point of reference potential (i.e., ground in the illustrative embodiment). Similarly, adjustable voltage dividing means in the form of a potentiometer 23 is connected between the center tap "*y*" of resistance 21 and ground.

An adder 27 is provided for combining with the green signals appearing at terminal $+G_{IN}$ the signals derived from the potentiometers 13 and 23 via their respective adjustable taps 15 and 25. The output of adder 27 appears across an output control potentiometer 33, the adjustable tap 35 of potentiometer 33 being connected to the green channel output terminal $G_{OUT}$.

It may be appreciated from the foregoing that the structure of the red and blue signal channels of the matrixing amplifier will be analogous to the green signal channel structure described above, the red signal channel operating on $+R_{IN}$, $-G_{IN}$ and $-B_{IN}$ signals, and the blue signal channel operating on $+B_{IN}$, $-R_{IN}$ and $-G_{IN}$ signals, to respectively provide $R_{OUT}$ and $B_{OUT}$ signals.

To appreciate the significant advantages of the present invention, an analysis of the makeup of the $G_{OUT}$ signal in terms of the input signals may be made. It may be noted that the signal appearing at center tap "*x*" and thus appearing across potentiometer 13 is equal to $$\frac{G_{IN}-R_{IN}}{2}$$

similarly, the signal appearing at center tap "*y*" and thus appearing across potentiometer 23 is equal to $$\frac{G_{IN}-B_{IN}}{2}$$

The $$\frac{G_{IN}-R_{IN}}{2}$$

and $$\frac{G_{IN}-B_{IN}}{2}$$

signals, multiplied by respective attenuation factors $a_1$ and $a_2$, determined by the respective settings of taps 15 and 25, are combined with a $G_{IN}$ signal in adder 27. The sum, multiplied by a channel gain control factor K, determined by the setting of tap 35, comprises the $G_{OUT}$ signal, i.e.

$$G_{OUT}=K\left[G_{IN}+a_1\left[\frac{(G_{IN}-R_{IN})}{2}\right]+a_2\left[\frac{(G_{IN}-B_{IN})}{2}\right]\right]$$

It will be readily appreciated that adjustments of the values of factors $a_1$ and $a_2$ by moving taps 15 and 25 achieve a wide range of masking adjustment of the green signal. If the tapped positions are such as to make $a_1$ and $a_2$ equal to zero, $G_{OUT}$ corresponds to an unmodified $G_{IN}$. However, as the tapped positions are adjusted to increase the factors $a_1$ and $a_2$, an increasing degree of masking is introduced which may be utilized, for example, to effectively increase the saturation of the green signal to compensate for undesired dilutions, dye deficiencies, camera spectral response errors, etc. It will be noted that the masked signal output comprises the sum of an unmodified input signal and a pair of color-difference signals. "Constant white" output is assured, since it will be observed that when the input signals are representative of white or gray shadings thereof, i.e., when $$G_{IN}=R_{IN}=B_{IN}$$

the color-difference signals disappear (i.e., $G_{IN}-R_{IN}=0$; $G_{IN}-B_{IN}=0$), and the $G_{OUT}$ signal corresponds to the $G_{IN}$ signal, irrespective of the settings of taps 15 and 25.

In Figure 2, a modification of the apparatus described above is illustrated wherein advantage is taken of the unique nature of the present form of masking operations to substantially avoid the reduction in signal-to-noise ratio normally accompanying prior art forms of color signal masking. The modification involves the insertion of a low pass filter in the path of the color-difference signals that are to be combined with the unmodified input signal. Thus, in the modification of Figure 2, the color-difference signals, derived from potentiometers 13 and 23 via their respective adjustable taps 15 and 25, are combined in an adder 37 and then passed through a low pass filter 39 prior to their application to adder 27 for combination with the unmodified $G_{IN}$ signals. The passband of low pass filter 39 preferably corresponds to the frequency range wherein component color signals as such are utilized in the overall system, e.g., 0–1.5 mc. Suitable delay means 41 are inserted in the path of the $G_{IN}$ signals to equalize for the delay suffered by the color-difference signals in the filter 39.

The use of low pass filter 39 insures that the masking operation will cause very little increase in the noise accompanying the output signal, since most of the noise generated in the usual pickup device falls in a high frequency region beyond the passband of filter 39. One of the drawbacks to the use of masking amplifiers heretofore has been an inherent multiplication of noise components due to the masking operations and a resultant deterioration of signal-to-noise ratio of serious magnitude. Through practice of the present invention, however, masking may be performed as desired without significantly disturbing the signal-to-noise ratio of the component color signals to be utilized in the system. Since in accordance with the color broadcast standards of the FCC, high frequency color information as such is not utilized, the cutoff of the color-difference signals in the masking amplifier at a frequency corresponding to the useful limit of color information is not objectionable. Thus, the masking amplifier of Figure 2 performs no masking operation for signal frequencies above this cutoff frequency, the $G_{OUT}$ signal corresponding to an unmodified version of the $G_{IN}$ signal at these high frequencies; however, it is readily apparent that masking at these high signal frequencies would be without purpose, since the output signal in this frequency region is not utilized individually, but only in combination with the other component color signals as a brightness or luminance signal.

Attention may now be directed to Figures 3*a* and 3*b* where a complete masking amplifier, operating in accordance with the principles of the invention described above, is illustrated in schematic detail, drawing size requirements necessitating the split-up of the schematic representation between two successive figures, 3*a* and 3*b*, which are to be read together, terminal designations *a*, *b*, *c*, *a'*, *b'* and *c'* being provided in both figures to indicate the linking connections therebetween. The apparatus of Figures 3*a* and 3*b* represents a particular working embodiment of the present invention which has provided highly satisfactory results in the masking of color television signals. It will be appreciated that the values designated for various circuit components in Figures 3*a* and 3*b* are given by way of example only, and the invention is in no way restricted to the choice of these particular values.

A plurality of input terminals $G_i$, $R_i$ and $B_i$ are illustrated as coupled to the control grids of respective amplifiers 51, 53 and 55. The amplifiers 51, 53 and 55 serve as phase splitting means providing at their respective anodes and cathodes a pair of output signals of mutually opposite polarity corresponding to the respective component color input signal. The output signals appearing at the phase splitter cathodes are arbitrarily designated as "plus" signals, and those at the anodes "minus" signals, for the purposes of the present description.

A plurality of resistive voltage dividers 57, 59 and 61 are provided for obtaining desired combinations of the various outputs of the phase splitting stages. Voltage divider 57 is connected between the cathode of amplifier 51 (i.e., a +G point) and the anode of amplifier 53 (−R); voltage divider 59 is connected between the cathode of amplifier 53 (+R) and the anode of amplifier 55 (−B); and the voltage divider 61 is connected between the cathode of amplifier 55 (+B) and the anode of amplifier 51 (−G). Each of the voltage dividers 57, 59 and 61 is tapped at its effective center point to respectively provide G–R, R–B and B–G signals for application to the control grids of respective amplifiers 63, 65 and 67. The latter set of amplifiers serves to provide additional phase splitting stages whereby, for example, both R–G and G–R signals as desired in the matrixing operation may be obtained from the G–R voltage divider 57. Thus, a potentiometer 71 is illustrated as connected between the anode of amplifier 63 and a point of reference potential (i.e., ground in the illustrative embodiment), and a potentiometer 73 is illustrated as connected between the cathode of amplifier 63 and ground. Similarly a potentiometer 75 and a potentiometer 77 are illustrated as connected between ground and the anode and the cathode of amplifier 65, respectively, and a potentiometer 79 and a potentiometer 81 are illustrated as connected between ground and the anode and the cathode of amplifier 67, respectively. The adjustable tap of each of these potentiometers is connected to the input electrode of a respective one of the amplifiers 83, 85, 87, 89, 91 and 93.

It may be noted at this point that a plurality of single-pole, double-throw switches 70 are provided in association with the potentiometers 71, 73, etc., each permitting the alternative coupling of a respective one of the potentiometers 71, 73, etc., to the anode or cathode of the respectively associated one of the three amplifiers 63, 65 and 67. This effectively permits variation of the polarity as well as the magnitude of the previously discussed factors $a_1$ and $a_2$ in effecting the desired signal masking. Thus, for example desired amounts of either G–R and R–G signals may be combined with desired amounts of either G–B or B–G signals in effecting a desired masking of the G signal. A range of masking adjustments is therefore provided whereby effective shifting of primaries in any direction, and increases or decreases in effective saturation of the respective component color signals may be readily achieved.

An explanation of the green masking channel will now be made for illustrative purposes. It will be appreciated that the red and blue masking channels are analogous in structure and operation thereto. For the purposes of green signal masking, the outputs of amplifiers 83 and 93 are combined and applied to a low pass filter 94G, which has a cut-off frequency corresponding to the upper limit of the limited frequency range devoted to color information in the color television system for which the masking signals are provided. This limit frequency may for example be approximately 1.5 mc. The output of filter 94G is applied through an amplifier 95G to an output amplifying stage 97G. Added to these signals at the input of amplifier 97G are substantially unmodified green input signals, derived from the input terminal $G_i$. The application of the green input signals to amplifier 97G is effected via a path including a delay line 92G and an amplifier 96G, the delay line 92G introducing a delay compensation for these signals to balance the delay suffered by the masking signals in filter 94G. The output amplifier 97G is provided with an adjustable cathode resistor 99G which serves as an output gain control for the green channel. The green channel output terminal $G_{OUT}$ is coupled to the anode of amplifier 97G, masked green signals appearing at this terminal for utilization as desired in subsequent operations of the color television signalling system.

It will be appreciated that the principles of operation of the masking amplifier of Figures 3*a* and 3*b* are substantially those previously described with respect to the apparatus of Figure 2. Thus, the form and degree of masking desired is adjusted for the green channel by varying the position of the taps on the potentiometers 71 and 81 to alter the relative magnitude of the green, red and green, blue color-difference signals that are combined with the green signals derived directly from terminal $G_1$. It will be appreciated that when the input signals are representative of white, and thus are equal, the G–R, R–B and B–G signals derived from the effective center points of voltage dividers 57, 59 and 61 disappear (i.e., equal zero) and only the straight-through signals appear at the respective output terminals $G_{OUT}$, $R_{OUT}$ and $B_{OUT}$. With output gain controls 99G, 99R and 99B adjusted to balance these output signals under such conditions, it will be appreciated that the masking amplifier will remain white-balanced irrespective of the tap settings on potentiometers 71, 73, etc. Also the filtering of the masking signals in filters 94G, 94R and 94B insures that the masking operations will be carried out with little or no reduction in the signal-to-noise ratio of the output signals relative to the signal-to-noise ratio of the input signals.

It may be noted that each of the filters 94G, 94R, and 94B is provided with a respective output potentiometer (100G, 100R and 100B) whereby adjustment of the magnitude of the combined color-difference signals to be added to the component color signal in the respective masking channel may be made. As indicated in the drawing, these controls may be ganged to provide a means for adjusting the degree of masking for all of the masking channels in common. Such a control may prove advantageous, for example, in operations correcting for film dye deficiencies, where the type of masking required may remain substantially the same, but the magnitude of correction required may vary with the particular film stock employed. It may also be noted that the apparatus illustrated in the views of Figure 3 includes respective switches 102 and 104 in each masking channel whereby the color-difference signal or the straight-through signal contribution to the output may be removed when desired, as for apparatus test purposes, for example. It will be appreciated that the schematic of Figures 3*a* and 3*b* is but illustrative of various particular forms of apparatus which may be utilized to carry out masking operations in accordance with principles of the present invention. The specific values of resistance, capacitance, etc. indicated on the drawing for the various elements of the Figure 3 circuit are given in accordance with a particular example which has proved satisfactory in operation, but it should be understood that practice of the present invention is in no way limited to the use of these particular circuit constants.

Having thus described my invention, what is claimed is:

1. In a color television system provided with a plurality of simultaneous component color signals, each of said component color signals being nominally representative of a primary color, matrixing apparatus comprising the combination of means for applying said component color signals to said matrixing apparatus, means for combining a first one of said component color signals with a second one of said component color signals, means for combining said first component color signal with a third one of said component color signals, means for independently adjusting the amplitude of the output of each of said first-named and second-named signal combining means, an adder, and means for applying said first component color signal and the outputs of said first-named and said second-named signal combining means to said adder.

2. Apparatus in accordance with claim 1 wherein means are additionally provided for reversing the polarity of the second and third component color signals applied to said first-named and said second-named signal combining means with respect to the polarity of said first component color signal applied thereto.

3. Apparatus in accordance with claim 2 wherein the means for applying said signal combining means outputs to said adder comprise respective low pass filters.

4. Apparatus in accordance with claim 2 wherein means are additionally provided for restricting the bandwidth of the signal combining means outputs applied to said adder relative to the bandwidth of the first component color signal also applied thereto.

5. In a color television system provided with a source of a plurality of simultaneous component color signals comprising respective red, blue and green component color signals of a first polarity, and corresponding red, blue and green component color signals of the opposite polarity, a masking amplifier comprising in combination a green signal masking channel including means for deriving from said source a mixture of the green signals of said first polarity and the blue signals of said opposite polarity, means for deriving from said source a mixture of the green signals of said first polarity and the red signals of said opposite polarity, each of said deriving means being provided with means for independently adjusting the amplitude of the respective derived mixture, and signal adding means coupled to the outputs of both of said mixture deriving means and also receptive of the green signals of said first polarity for providing a masked green output signal.

6. A masking amplifier in accordance with claim 5 wherein the coupling of the outputs of both of said mixture deriving means to said signal adding means is effected via respective low pass networks.

7. A masking amplifier in accordance with claim 5 also including in combination a red signal masking channel including means for deriving from said source a mixture of the red signals of said first polarity and the blue signals of said opposite polarity, means for deriving from said source a mixture of the red signals of said first polarity and the green signals of said opposite polarity, each of said deriving means being provided with means for independently adjusting the amplitude of the respective derived mixture, and signal adding means coupled to the outputs of both of said mixture deriving means and also receptive of the red signals of said first polarity for providing a masked red output signal; and a blue signal masking channel including means for deriving from said source a mixture of the blue signals of said first polarity and the green signals of said opposite polarity, means for deriving from said source a mixture of the blue signals of said first polarity and the red signals of said opposite polarity, each of said deriving means being provided with means for independently adjusting the amplitude of the respective derived mixture, and signal adding means coupled to the outputs of both of said mixture deriving means and also receptive of the blue signals of said first polarity for providing a masked blue output signal; the respective masked green, red and blue output signals being substantialy equal to each other when said plurality of simultaneous component color signals are representative of picture white, irrespective of the settings of said portion adjusting means.

8. A masking amplifier in accordance with claim 7 wherein the coupling between each of said mixture deriving means and the respectively associated signal adding means comprises a respective low pass filter.

9. In a color television system provided with a source of a plurality of simultaneous color signals representative of an image to be televised, said plurality of component color signals comprising respective red, blue and green color signals, a masking amplifier comprising in combination a green signal masking channel including means for forming a green minus blue signal of adjustable amplitude, means for forming a green minus red signal of adjustable amplitude, and means for combining the green minus blue, and the green minus red signals with said green component color signal to provide a masked green output signal whereby the amplitude of the masked green output signal is independent of the adjustments of the amplitudes of said green minus blue and green minus red signals whenever said plurality of simultaneous component color signals are representative of white areas of said image.

10. A masking amplifier in accordance with claim 9 wherein means are additionally provided for restricting in band-width the green minus blue and green minus red signals relative to the bandwidth of the green component color signal combined therewith in said signal combining means.

11. In a color television system including a source of three simultaneous component color signals, color signal masking apparatus comprising in combination a masking channel for each of said three simultaneous component color signals, each of said masking channels including means coupled to said source for forming a pair of color-difference signals of independently adjustable amplitude, one of said pair of color-difference signals being representative of the difference between the component color signal for which the respective masking channel is provided and one of the remaining two component color signals, the other of said pair of color-difference signals being representative of the difference between the component color signal for which the respective masking channel is provided and the other of the remaining two component color signals, each of said masking channels also including means for adding together the pair of color-difference signals formed in the respective channel and the component color signal for which the respective channel is provided.

12. Masking apparatus in accordance with claim 11 wherein means are additionally provided in each of said masking channels for restricting the bandwidth of the pair of color-difference signals applied to the adding means of the respective channel relative to the bandwidth of the component color signal applied thereto.

13. In a color television system provided with a source of three different simultaneous component color signals, masking apparatus comprising in combination a masking channel for each of said three different simultaneous component color signals, each of said masking channels including means coupled to said source for forming a pair of color-difference signals, one of said color-difference signals being representative of the difference between the component color signal for which the respective channel is provided and one of the remaining two component color signals, the other of said color-difference signals being representative of the difference between the component color signal for which the respective channel is provided and the other of the remaining two component color signals, each of said masking channels also including signal adding means coupled to said source and to said color-difference signal forming means for obtaining the sum of the component color signals for which the respective channel is provided and the pair of color-difference signals formed in the respective channel, each of said masking channels also including means for independently adjustably attenuating each of the pair of color-difference signals applied to its signal adding means relative to the component color signal applied thereto.

14. Masking apparatus in accordance with claim 13 wherein each of said masking channels is additionally provided with a low pass filter in the path of application of color-difference signals to the signal adding means therein for restricting the range of frequencies of the pair of color-difference signals applied to said signal adding means relative to the range of frequencies of the component color signal applied thereto.

15. In a color television system including a source of three different simultaneous component color signals, color signal masking apparatus including a masking channel for a first one of said three component color signals comprising in combination means coupled to said source for effectively subtracting a second one of said three simultaneous component color signals from said first component color signal to obtain a first color-difference signal, means for effectively subtracting the remaining one of said three simultaneous component color signals from said first component color signal to obtain a second color-difference signal, means for independently adjusting the amplitudes of said first and second color-difference signals, and means for adding said first and second color-difference signals of adjusted amplitude to said first component color signal to obtain a masked signal output for said first component color signal masking channel.

16. Color signal masking apparatus in accordance with claim 15 wherein said masking channel is also provided with means interposed between said color-difference signal amplitude adjusting means and said adding means for substantially attenuating the color-difference signals applied to said adding means at signal frequencies above a predetermined frequency whereby said masked signal output substantially corresponds to said first component color signal at signal frequencies above said predetermined frequency.

17. Masking apparatus in accordance with claim 13 wherein each of said masking channels is additionally provided with means for adjustably attenuating, in common, the pair of color difference signals applied to the channel's signal adding means relative to the component color signal applied thereto.

18. Masking apparatus in accordance with claim 17 wherein all of said last-named signal attenuating means are effectively ganged for common adjustment.

References Cited in the file of this patent

UNITED STATES PATENTS

| | | |
|---|---|---|
| 2,680,147 | Rhodes | June 1, 1954 |
| 2,713,607 | Rhodes | July 19, 1955 |
| 2,716,151 | Smith | Aug. 23, 1955 |
| 2,718,546 | Schlesinger | Sept. 20, 1955 |
| 2,763,716 | Farr | Sept. 18, 1956 |